United States Patent [19]

Heppenstall et al.

[11] Patent Number: 5,066,453
[45] Date of Patent: Nov. 19, 1991

[54] NUCLEAR FUEL ASSEMBLY COOLANT CONTROL

[75] Inventors: Neil G. Heppenstall, MacClesfield; Colin Betts, Altrincham; James Ford, West Derby, all of United Kingdom

[73] Assignee: The Secretary of State for United Kingdom Atomic Energy Authority in Her Britannic Majesty'Government of The United Kingdom of Great Britain and Northern Ireland, London, England

[21] Appl. No.: 389,298

[22] Filed: Aug. 3, 1989

[30] Foreign Application Priority Data

Aug. 5, 1988 [GB] United Kingdom ............... 8818701

[51] Int. Cl.⁵ .................. G21C 3/30; G21C 15/06
[52] U.S. Cl. ...................... 376/352; 376/236; 376/175; 376/445; 138/37; 138/46
[58] Field of Search .......... 376/352, 445, 336, 175, 376/236, 213; 138/37, 45, 46, 43

[56] References Cited

U.S. PATENT DOCUMENTS

| | | | |
|---|---|---|---|
| 3,036,965 | 5/1962 | Braun | 376/352 |
| 3,070,697 | 12/1962 | Muench | 376/213 |
| 3,208,913 | 9/1965 | Hennig | 376/352 |
| 3,214,343 | 10/1965 | Natland | 376/213 |
| 3,365,368 | 1/1968 | Fray | 376/236 |
| 3,661,708 | 5/1972 | Friedland | 376/445 |
| 4,202,726 | 5/1980 | Duncombe et al. | 375/352 |
| 4,227,967 | 10/1980 | Zebroski | 376/327 |
| 4,431,603 | 2/1984 | Hecht | 376/352 |
| 4,493,812 | 1/1985 | Christiansen et al. | 376/352 |
| 4,588,549 | 5/1986 | Huffer | 376/352 |

FOREIGN PATENT DOCUMENTS

| | | | |
|---|---|---|---|
| 0005990 | 1/1984 | Japan | 376/352 |
| 0077382 | 5/1984 | Japan | 376/352 |
| 880489 | 10/1961 | United Kingdom . | |
| 1020668 | 2/1966 | United Kingdom . | |
| 1085230 | 9/1967 | United Kingdom . | 376/236 |
| 1135925 | 12/1968 | United Kingdom . | |
| 1292940 | 10/1972 | United Kingdom . | |
| 1431959 | 4/1976 | United Kingdom . | |

OTHER PUBLICATIONS

APEX-492, May 1959, pp. 7, 16, 20, 71-74.

*Primary Examiner*—Harvey E. Behrend
*Attorney, Agent, or Firm*—William R. Hinds

[57] ABSTRACT

An apparatus for controlling the flow of coolant through a nuclear fuel assembly, in which a coolant flow restrictor 26 having longitudinal ducts 30 is provided with plug members 48, 49, 50 of different lengths. The plug members 48, 49, 50 are moved longitudinally by the effect of neutron induced growth on an actuating member 60. A connecting member 53 converts the growth of the actuating member 60 into a longitudinal movement of the plug members 48, 49, 50 so that they are progressively withdrawn from the flow restrictor 26 to increase the flow of coolant through the flow restrictor 26.

9 Claims, 3 Drawing Sheets

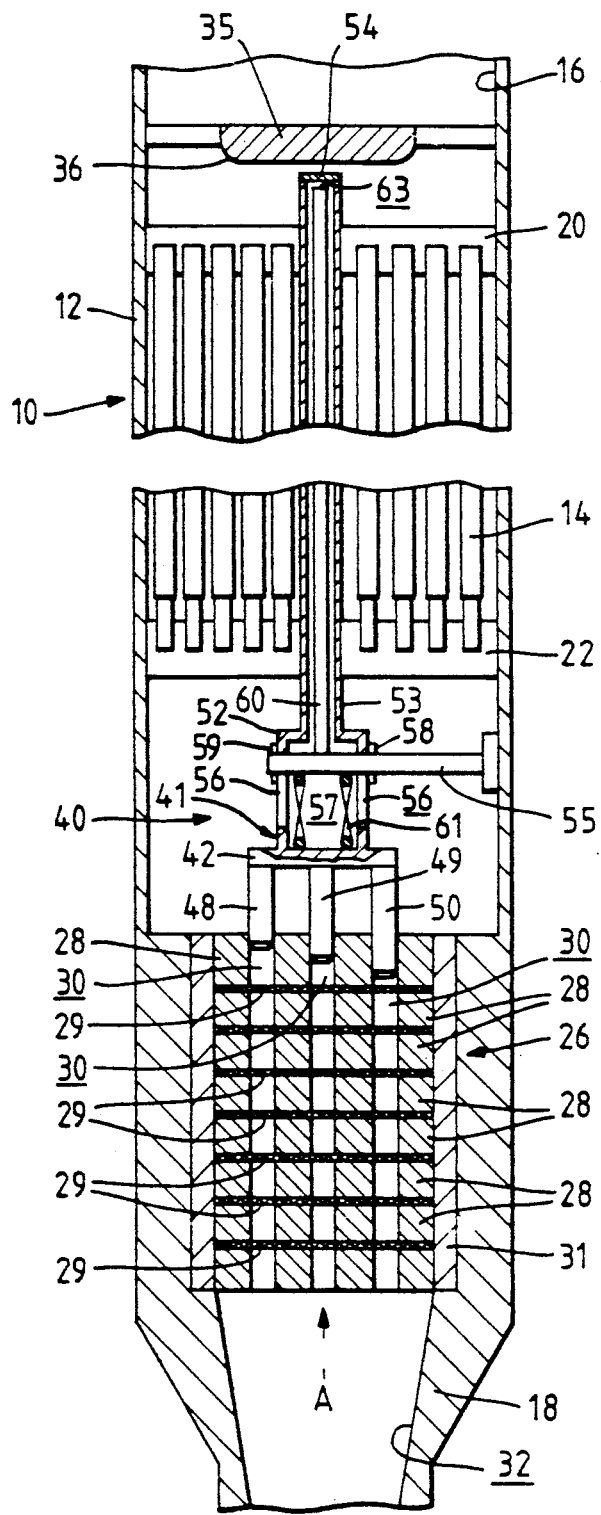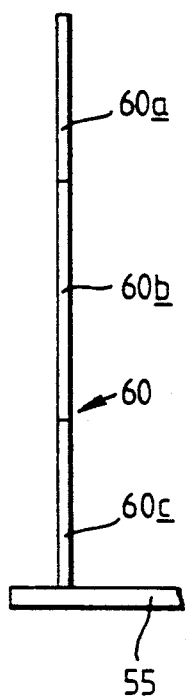

NUCLEAR FUEL ASSEMBLY COOLANT CONTROL

This invention relates to the control of coolant flow through a nuclear reactor fuel assembly, and is particularly but not exclusively concerned with controlling the rate of flow of liquid metal coolant through a fuel assembly of a fast neutron nuclear reactor, (hereinafter referred to as "a Fast Reactor").

In a nuclear reactor, comprising numerous individual fuel elements, regions of different coolant temperature may develop giving rise to thermal stresses in the core structure of the reactor. To avoid these stresses it is desirable that the nuclear fuel within the reactor operates as far as possible at a uniform temperature, and to achieve this the rate of flow of coolant through different fuel elements of the reactor is usually controlled.

Variations in temperature within the reactor are a particular problem in Fast Reactors which contain both fissile fuel and fertile or breeder fuel, since the heat output from the breeder fuel starts at a low level but rises over a period of time to a substantially greater level. Consequently, the temperature of the liquid metal coolant emerging from a Fast Reactor fuel assembly containing breeder fuel rises during the operation of the Reactor towards the temperature of the fissile fuel. It is desirable to stabilise the temperature of the coolant, for example at about 550° C. in a Fast Reactor, so as to maintain efficient heat transfer between the coolant and the fuel, and optimum fuel life.

In general, the invention provides an apparatus for controlling the flow of coolant through a nuclear fuel assembly, the apparatus comprising a variable flow restrictor locatable in the fuel assembly, means responsive to neutron radiation at a location in the fuel assembly in a manner to cause neutron induced growth of the responsive means, and a connecting means for connecting the neutron radiation responsive means to the variable flow restrictor for controlling the flow of coolant through the assembly.

Preferably, the variable flow restrictor comprises a plurality of longitudinally aligned ducts, and a plugging means having an array of plugging members locatable in some of the ducts, the plugging members being of different lengths so that longitudinal displacement of the plugging means by the connecting means progressively opens or closes some of the ducts.

Conveniently, the neutron radiation responsive means comprises at least one elongate member supportable by the fuel assembly and arranged to support an elongate portion of the connecting means, the elongate member comprising at least one material having a greater neutron-induced growth property than that of the elongate portion so as to cause longitudinal displacement of the connecting means as the elongate member grows under neutron irradiation.

The elongate member might comprise a rod member extendable within a said elongate portion of tubular form. The rod member might comprise a plurality of rod portions disposed one upon the other, at least some of the rod portions having different neutron-induced growth properties than other said rod portions so as to produce a required longitudinal growth of the rod member under the neutron radiation. Desirably, the rod member is arranged so that an initial longitudinal neutron-induced growth is necessary before the rod member supports the elongate portion. Alternatively, some of the rod portions might be mechanically treated, for example cold worked, so as to introduce a delay in the onset of growth in the rod portions under the neutron irradiation.

The elongate member might be of tubular form and the elongate portion might comprise a rod element extending within said tubular elongate member.

The invention will now be further described by way of example only with reference to the accompanying drawings in which:

FIGS. 1a and 1b show a modification of FIG. 1;

In the FIGS. like parts have like numerals.

Figure 1:
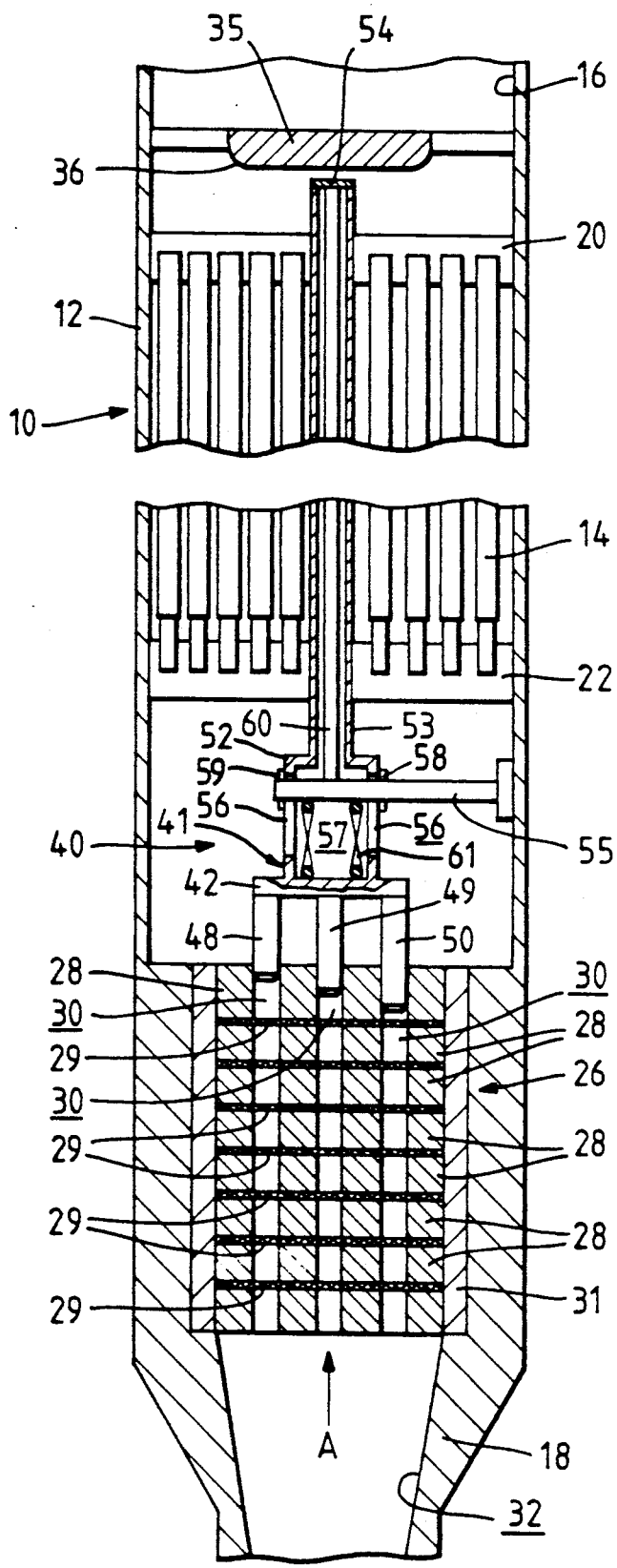
FIG. 1 shows a diagrammatic representation in medial longitudinal section of part of a nuclear fuel assembly.

Referring now to FIG. 1, part of a Fast Reactor nuclear fuel assembly 10 is shown which conventionally comprises a wrapper 12 of hexagonal cross-section and a plurality of fuel pins 14 arranged lengthwise within the wrapper 12 at a position intermediate the upper end 16 of the wrapper 12 and the lower end 18 of the wrapper 12. The fuel pins 14 are shown located in known manner between an upper support grid 20 and a lower support grid 22, and the fuel pins 14 are spaced apart in a hexagonal array, for example by spacer grids or fins (not shown) so as to allow coolant to flow between the fuel pins 14. The lower end 18 of the wrapper 12 is provided with a flow restrictor in the form of a known gag 26 of cylindrical form comprising a series of perforated plates 28 and meshes 29 located within a hollow cylinder 31 and disposed one on top of the other so as to provide a number of ducts in the form of passageways 30 (only three are shown) which extend lengthwise of the wrapper 12. A tapered inlet 32 is provided at the lower end 18 and, in use, liquid sodium coolant flows into the wrapper 12 in the direction of arrow "A" via the inlet 32, upwardly through the passageways 30 in the gag 26 and then upwardly around the fuel pins 14 before exiting from the wrapper 12 at the upper end 16. A circular mixer plate 35 has a radiused lower corner 36, and a sharp upper corner which assists in mixing the coolant in the upper end 16.

Typically, in a breeder fuel element the fuel comprises an array of breeder pins 14. The heat output of the breeder pins 14 starts at a low level, eg 9wg$^{-1}$ and builds up over time and accumulated neutron radiation dose to about 25Wg$^{-1}$ after 600 days. Thus the variation in fuel assembly power output can rise from about 0.3 MW at the start to about 1.5 MW at 2% burn-up before it is withdrawn from the reactor.

A variable flow control device 40 is provided in the nuclear fuel assembly 10 and comprises a cylindrical member 41 having a circular flange 42 from which a number of cylindrical pegs 48, 49, 50 respectively (only three are shown) depend which are locatable in only some of the passageways 30. The pegs 48, 49, 50 differ in length so that longitudinal displacement of the pegs 48, 49, 50 opens or closes one or more of the passageways 30. A hollow cylindrical housing 52 extends upwardly from the flange 42, and a tubular portion 53 extends from the housing 52 through the region of the fuel pins 14 and terminates in a closed end 54 below the mixer plate 35. A support arm 55 is secured to and extends from the wrapper 12, and passes through openings 56 in the side of the housing 52 and through a cavity 57. Collars 58, 59 secured to the arm 55 locate either side of the housing 52 and maintain the alignment of the housing 52 and thereby the pegs 48, 49, 50 with the gag 26. The arm 55 supports a rod 60 which extends upwardly inside the tubular portion 53 to abut the closed end 54. A compression spring 61 acting between the underside of the arm 55 and the base of the cavity 57 biases the member 41 downwardly against the upthrust of the liquid sodium on the pegs 48, 49, 50, so that the rod 60 is forced against the closed end 54.

The rod 60 is made from a material that exhibits greater neutron-induced growth under neutron irradiation than the material of the tubular portion 53. Consequently, in operation under neutron irradiation, the rod 60 grows and bears against the end 54 and forces the flow control device 40 upwardly, thereby progressively withdrawing the pegs 48, 49, 50 from the passageways 30 to increase coolant flow through the gag 26.

The number of pegs 48, 49, 50 is selected to allow a required number of passageways 30 to remain permanently open, so that a required minimum flow of coolant is provided along the fuel pins 14. The function of the mesh 29 is to provide a basic restriction to flow in the passageways 30, and the size of the mesh 29 needs to be selected in conjunction with the number of and diameter of the passageways 30 to provide a required flow rate of the coolant through the gag 26.

The rod 60 may be made from a material such as PE16 Nimonic nickel alloy, or from an austenitic stainless steel such as AISI321 which has a typical composition:

0.05 C, 17.5 Cr, 9.5 Ni, 0.5 Mo, 1.0 Mn, 0.4 Ti, 0.3 Si

The stainless steel may be mechanically treated, eg cold worked, to vary its initial neutron-induced growth property, for example to delay the onset of neutron induced growth.

The rod 60 may be of composite form and comprise several cylindrical sections, e.g., 60a, 60b, 60c, (FIG. 1a) having different neutron-induced growth properties and placed one upon the other, to provide a required extension of the composite rod 60 under a specified neutron radiation. Preferably, the relatively high growth sections would be located at the position of the greatest neutron radiation in the core of the reactor.

In order to provide an initial dwell period, as shown in FIG. 1b the rod 60 might be shorter than the tubular portion 53 to define a gap 63 (shown exaggerated for clarity, so that a predetermined amount of growth of the rod 60 would be necessary before the rod 60 abutted and supported the tubular portion 53 at the closed end 54. A stop, for example the arm 55 abutting the upper ends of the openings 56, would be necessary to arrest the downward movement of the tubular portion 53 under the bias of the spring 61.

The member 41 or at least the tubular portion 53 may be made from a ferritic martensitic steel such as AISI 410 or Firth Vickers 448, which have a typical composition:

0.11 C, 11.0 Cr, 0.65 Ni, 0.7 Mo, 1.0 Mn, 0.4 Si, 0.4 Nb, 0.3 V, 0.005 B max

Figure 2:
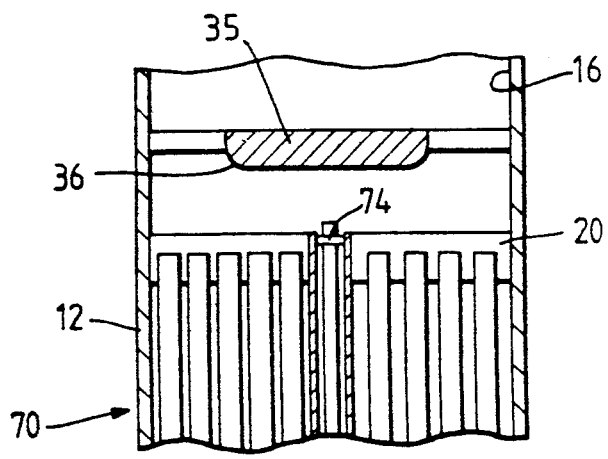
FIG. 2 shows a modification of FIG. 1.
Figure 2:
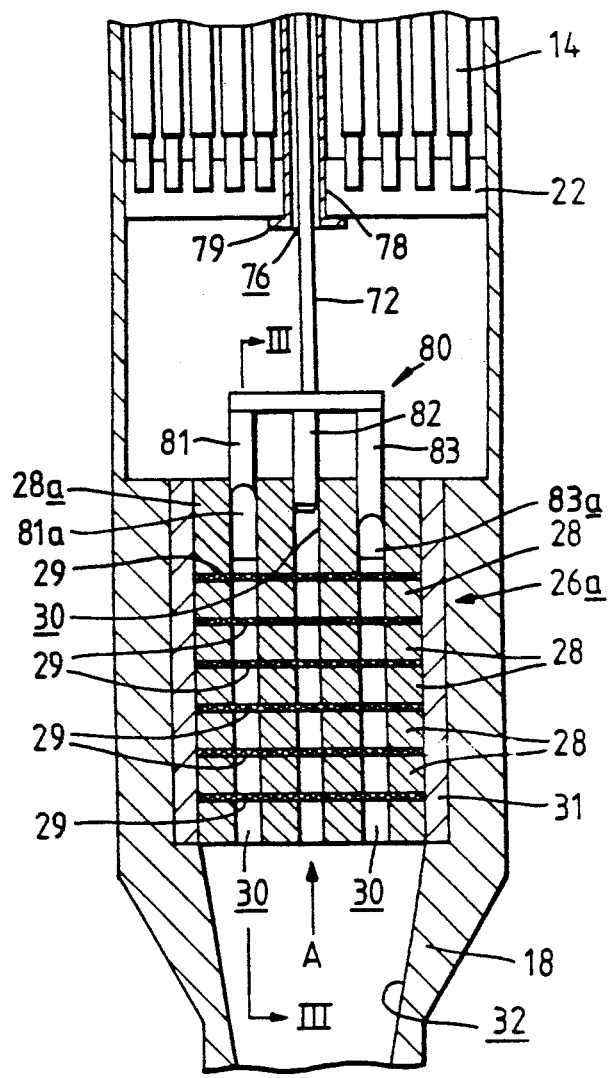

It will be appreciated that alternative materials may be used for the tubular portion 53 and the rod 60, and alternative arrangements may be possible, for example as shown in FIG. 2.

Figure 3:
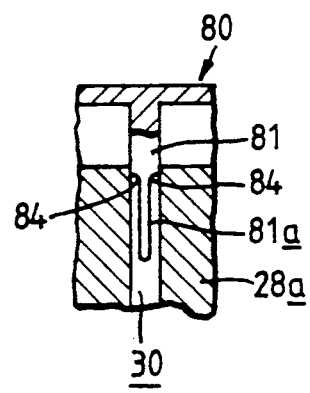
FIG. 3 shows a fragmentary sectional view on the line III—III of FIG. 2.

In FIG. 2, a nuclear fuel assembly 70 is shown similar in many respects to the assembly 10 of FIG. 1, but having a central rod 72 of a material such as Fv448 which exhibits low neutron-induced growth. The upper end of the rod 72 is held by a clamp 74 to the bore 76 of a tube 78 made from a material such as PE16 Nimonic, or AISI 321 steel. The tube 78 is fixed to the lower support grid 22 and has a flange 79 that locates on the underside of the lower support grid 22. The lower end of the rod 72 is joined to a variable flow control device 80 similar in many respects to the device 40 of FIG. 1, in having a number of cylindrical pegs 81, 82, 83 respectively (only three being shown). The pegs 81, 82, 83 locate in passageways 30 in a gag 26a identical to the gag 26 of FIG. 1 except that the topmost mesh 29 of FIG. 1 is omitted and an upper perforated plate 28a fitted instead of the upper two plates 28 of FIG. 1. The outermost pegs 81, 83 terminate, as shown more clearly in FIG. 3, in central tongues 81a, 83a having radiused ends and joined by curved shoulders 84 to the cylindrical portions of the pegs 81, 833 so as to maintain the alignment of the flow control device 80 with the gag 26a when the cylindrical portions of the pegs 81, 83 are withdrawn from the passageways 300 without imposing a serious restriction on coolant flow through the passageways 30.

In operation, the greater neutron-induced growth of the tube 78 lifts the rod 72 which consequently raises the variable flow control device 80 so to withdraw the pegs 81, 82, 83 progressively from the passageways 30.

Although the invention has been described in relation to a fuel assembly for a Fast Reactor, it may have applications in fuel assemblies for alterative nuclear reactors.

It will be appreciated that pegs 81,82, 83 having tongues 81a, 82a, 83a respectively may be used in the fuel assembly 10 of FIG. 1, which would allow the collars 58, 59 to be dispensed with.

We claim:

1. In a nuclear fuel assembly for a fast nuclear reactor arranged to be cooled by liquid metal, the assembly comprising an elongate metal wrapper, and a plurality of nuclear fuel pins arranged lengthwise therein at a position intermediate the ends of the wrapper, and one of said ends comprising ann inlet for the flow of liquid metal through the wrapper, wherein the improvement comprises a variable flow restrictor for the liquid metal located at the inlet, the variable flow restrictor defining a plurality of ducts for the liquid metal aligned in parallel relationship longitudinally with respect tot he wrapper, means for plugging at least some of the ducts, the plugging means having an array of plugging members locatable in some of the ducts, the plugging members being of different lengths so that longitudinal displacement of the plugging means progressively opens or closes some of the ducts, responsive means disposed lengthwise in the wrapper and responsive to neutron radiation in a manner to cause a predetermined neutron-induced growth of the responsive means, and connecting means for connecting the responsive means to the plugging means so as to effect said longitudinal displacement of the plugging means in response to neutron-induced growth of the responsive means.

2. In a nuclear fuel assembly as claimed in claim 1 wherein at least some of the plugging members terminate in tongue portions thereof to maintain alignment of the plugging means relative to the variable flow restrictor as the plugging means is progressively withdrawn therefrom.

3. In a nuclear fuel assembly as claimed in claim 1, wherein the connecting means includes spring means for biasing the plugging means towards the variable flow restrictor.

4. Apparatus as claimed in claim 1, in which the neutron radiation responsive means comprises at least one elongate member supportable by the fuel assembly and arranged to support an elongate portion of the connecting means, the elongate member comprising at least one material having a greater neutron-induced growth property than that of the elongate portion so as to cause longitudinal displacement of the connecting means as the elongate member grows under neutron irradiation.

5. Apparatus as claimed in claim 4, in which the elongate member comprises a rod member extendable within a said elongate portion in tubular form.

6. Apparatus as claimed in claim 5, in which the rod member comprises a plurality of rod portions disposed one upon the other, at least some of the rod portions having different neutron-induced growth properties than other said rod portions so as to produce a required longitudinal growth of the rod member under the neutron radiation.

7. Apparatus as claimed inn claim 3, in which the rod member is arranged so that an initial longitudinal neutron-induced growth is necessary before the rod member supports the elongate portion.

8. Apparatus as claimed inn claim 3, in which some of the rod portions are mechanically treated to introduce a delay in the onset of growth in the rod portions during neutron irradiation.

9. Apparatus as claimed in claim 4, in which the elongate member is in tubular form and the elongate portion comprises a rod element extending within said tubular elongate member.

* * * * *

UNITED STATES PATENT AND TRADEMARK OFFICE
CERTIFICATE OF CORRECTION

PATENT NO. : 5,066,453

DATED : November 19, 1991

INVENTOR(S) : HEPPENSTALL, NEIL G.; BETTS, COLIN; FORD, JAMES

It is certified that error appears in the above—identified patent and that said Letters Patent is hereby corrected as shown below:

On the title page of the printed patent, the information page, under the heading "[73] Assignee" the name of the assignee is changed to --United Kingdom Atomic Energy Authority--.

Signed and Sealed this

Second Day of March, 1993

Attest:

STEPHEN G. KUNIN

Attesting Officer

Acting Commissioner of Patents and Trademarks